(No Model.)
H. BROOKE.
MANUFACTURE OF NECKS OF GLASS BOTTLES.
No. 596,319. Patented Dec. 28, 1897.
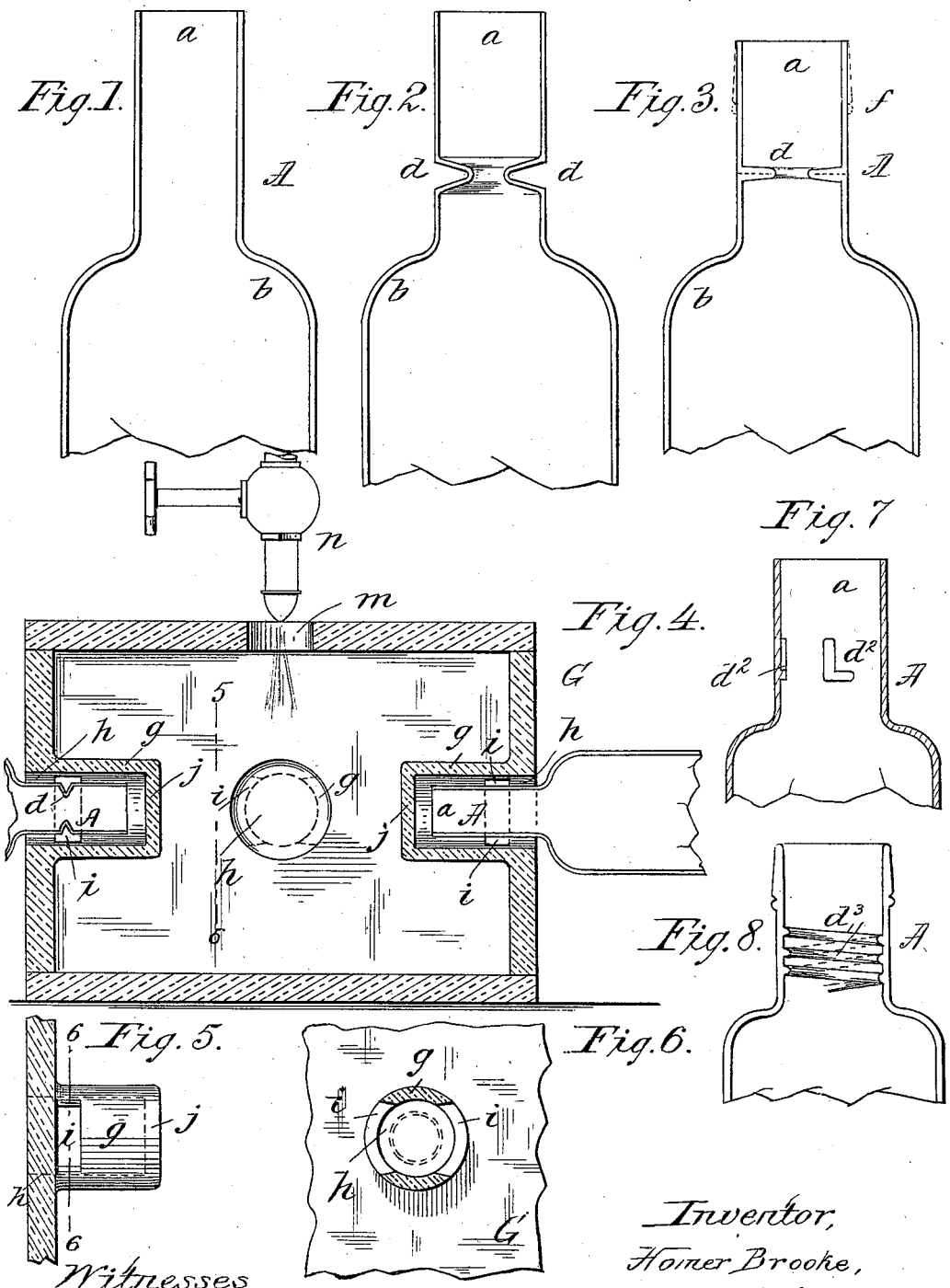

UNITED STATES PATENT OFFICE.

HOMER BROOKE, OF JERSEY CITY, NEW JERSEY.

MANUFACTURE OF NECKS OF GLASS BOTTLES.

SPECIFICATION forming part of Letters Patent No. 596,319, dated December 28, 1897.

Application filed October 9, 1896. Serial No. 608,319. (No model.)

*To all whom it may concern:*

Be it known that I, HOMER BROOKE, a citizen of the United States, and a resident of Jersey City, county of Hudson, and State of New Jersey, have invented certain new and useful Improvements in the Manufacture of the Necks of Glass Bottles, of which the following is a specification.

This invention relates to improvements in the manufacture of glass bottles which have their necks below their mouths provided with internal annular flanges, shoulders, or other locking or fitting parts. Shoulders integrally formed in and as a part of the neck of the bottle constitute in some cases valve-seats in bottles of the non-refillable class, and it has become very desirable to devise simple, efficient, and economical ways and means for producing the internally shouldered or fitting parts of necks without distortion of the necks or mouths of the bottles; and the invention consists in the method of peculiarly heating and operating on the glass forming the neck of the bottle for producing the internal fittings, shoulders, or projection below the mouth and for preferably leaving the exterior of the neck around such internal projection smooth and cylindrical or ungrooved.

The invention further consists in the novel means employed in carrying out the improved method or process. and all as will hereinafter be fully described, and set forth in the claims.

Reference is to be had to the accompanying drawings, forming part of this specification, in which—

Figure 1 is a sectional view of a part of a bottle comprising the neck of a form adapted to have formed therein an internal annular shoulder or other internally-projecting part. Fig. 2 is a similar sectional view showing the neck as having the glass thereof inwardly annularly displaced. Fig. 3 is a similar view to Fig. 2, but showing the inwardly and annularly displaced glass compressed in a direction corresponding to the axis of the neck, whereby exteriorly the neck is smooth and cylindrical. Fig. 4 is a vertical sectional view of a novel construction of glory-hole furnace especially designed for employment in carrying out this invention. Fig. 5 is a vertical sectional view through one side wall of this furnace as taken about on the line 5 5, Fig. 4, while Fig. 6 is a sectional view as taken on line 6 6, Fig. 5. Figs. 7 and 8 represent the necks of bottles having formations which may be produced by the exercise of the present invention.

It is assumed that bottles having plain cylindrical necks, as shown in Fig. 1, are provided as produced in a common and well-known manner, and it will be assumed by way of illustrating the availability of my invention that it is required to produce an annular internal shoulder therein.

My process first consists in rendering the glass in the neck A, especially at a portion thereof below the mouth $a$ and preferably above the shoulder or bulge $b$, plastic by heating and inwardly displacing the glass by forming an annular groove, as seen at $d$, Fig. 2, the inner surface of this groove producing an internal annular shoulder, flange, or ledge. This displacement and formation of the annular groove $d$ may be performed by the use of suitable tools.

The invention in part, and, further, in addition to the formation of the annular groove, as aforesaid, or the production of an internal projection of any form, consists in compressing the glass forming the neck of the bottle in the direction of the axis of the neck, the glass at the grooved part being maintained hot and plastic, whereby the groove is closed and the bottle-neck outside of the internal shoulder is flush and smooth and reinforces the neck at such place, the internally-shouldered portion of the neck assuming the form shown in Fig. 3.

The forming or truing the neck at and about the mouth and rendering the same with what is termed the "cork finish" and the external lip or head finish (indicated at $f$ in Fig. 3 in dotted lines) are accomplished by the use of suitable tools in a manner well known and generally practiced among bottle-makers. The valve-seat or internal shoulder-groove may be completed at the first heating and the cork finish and lip or head finish completed on a reheating, or both at once.

The heat at the part where the internal shoulder is to be produced is necessarily greater than that imparted to the mouth portion of the bottle, and inasmuch as this invention provides for the suitable high heating of the neck of the bottle below the mouth opening at the annular groove, or at the place where such groove is to be produced, or at the place below the mouth where an internal projection of any suitable form is to be produced, the heating-furnace of novel construction is required, which comprises a shield or protection against the overheating or the melting away or distortion under pressure of the mouth portion of the bottle-neck.

The furnace G has one or more ring-holes or glory-holes $h$, with an internally-applied shield or hood $g$, of thimble form, into which the neck of the bottle is inserted through the glory-hole. The thimble-shaped hood has the openings $i\,i$ at a suitable distance forward from its closed end $j$, through which the heating-flame may pass to and upon the annular grooved part of the bottle-neck or the part of the neck wherein such groove is to be produced. The furnace has through its top (or the same may be through one of its sides) the hole $m$, at which an injector burner $n$ is applied for the introduction of aerated hydrocarbon to be burned and for maintaining the interior of the furnace at an incandescent heat. The furnace may be constructed of any suitable and well-known refractory material, and may have several glory-holes and corresponding hooded shields with the sidewise flame-openings therethrough for the increase of its availability or capacity. The hood or shield adjoining the glory-hole allows the end of the neck to become plastic sufficiently to permit the shaping and molding and finishing, but the flame not getting to it it does not melt or run together. The neck is "overheated" at the proper place well below the mouth, so as to be rendered susceptible of being worked upon by tools for producing or molding any desired internal formation below the cork-opening.

In Figs. 7 and 8 views are shown wherein the bottle-necks are seen to comprise an L-shaped internal projection $d^2$ for a bayonet fitting or lock on the internal wall of the bottle; also, a helical rib $d^3$ to serve as a screw-thread.

The "overheating," as termed herein, of the neck of the bottle below the mouth is understood as the rendering of the glass constituting the stated portion of the bottle-neck so extremely plastic by a suitably high heat as to be easily and practicably displaced in considerable degree or extent as necessary to produce the required internal form, and by the use of hand or other tools for performing such work as distinguished from molds within which the bottle of the required shape is formed.

Shoulders, projections, or grooves in necks of bottles below the top end have been heretofore made by conforming the outside by molding in a mold, the internal conformation coming variably and irregularly according to the thickness of the glass as operated on from its outside; but I am not to be understood as herein claiming so broadly as to attempt to cover any such procedure in the formation of bottle-necks from plastic glass, but the rendering of the glass extremely plastic below the mouth, whereby the glass may be inwardly displaced and properly formed or trued on the inside by a tool or implement entered through the mouth and preferably, but not essentially, reinforced by the compression which closes the groove or indentation at the exterior of the bottle-neck, and the protection of the mouth portion of the neck whereby the glass thereat does not run together (whereby the tools or implements for directly truing or finishing the internal shoulder below the mouth could not be inserted) are factors and provisions to be taken into account in acquiring full understanding of the principal characteristics of the present invention.

Having thus described my invention, what I claim, and desire to secure by Letters Patent, is—

1. The improvement in the method of producing an internal shoulder, ridge or fitting in the neck of a bottle below its mouth, which consists in rendering the neck of the bottle below its mouth sufficiently plastic by heat, protecting the mouth portion of the bottle from being overheated, and while in such condition inwardly displacing the glass below the mouth, thereby producing the required internal shapes or ridges, substantially as described.

2. The improvement in the method of producing an internal annular shoulder or flange in the neck of a bottle which consists in rendering the neck of the bottle plastic, and while in such condition annularly grooving and inwardly displacing the glass, thereby producing the internal ridge or flange with a contracted opening therewithin, substantially as described.

3. The improvement in the method of producing an internally and annularly shouldered bottle-neck which consists in producing a bottle-neck with an annular groove, maintaining the so-grooved portion of the neck plastic by heat, and while plastic compressing in the direction of the axis of the neck, closing the walls of the groove and leaving the neck exteriorly flush or cylindrical, substantially as described.

4. The improvement in the method of producing an internally and annularly shouldered bottle-neck which consists in producing a neck with an annular groove, subjecting the neck to heat which is of a degree sufficient to render the glass plastic, shielding the portion of the neck above the groove from the excessive action of the heat whereby such portion is not melted away or distorted, and whereby such upper portion remains capable of withstanding mechanical pressure applied thereupon, and compressing the neck in the direction of its axis whereby the plastic portion comprising the groove is closed, substantially as described.

5. The improved glory-hole furnace for employment in the manufacture of bottle-necks having internal projections below their mouths, substantially as described, which comprises a furnace-chamber, one or more glory-holes, having internally-provided thimble-shaped hoods or shields, $g$, into which the necks of the bottles may be inserted, and provided with sidewise flame-openings, $i$, forward of their closed inner ends, and between the latter and their open outer ends, and means for maintaining a suitable high heat in the furnace-chamber, substantially as described.

In testimony that I claim the foregoing as my invention I have signed my name, in presence of two witnesses, this 16th day of September, 1896.

HOMER BROOKE.

Witnesses:
FREDERICK W. PARK,
CORNELIUS FISKE.